(12) United States Patent
Yamanaka et al.

(10) Patent No.: US 12,739,490 B2
(45) Date of Patent: Sep. 15, 2026

(54) SPECTRAL CAMERA

(71) Applicants: Public University Corporation Suwa University of Science Foundation, Nagano (JP); SEIKO EPSON CORPORATION, Tokyo (JP)

(72) Inventors: Shota Yamanaka, Matsumoto (JP); Masatoshi Yonekubo, Nagano (JP)

(73) Assignees: Public University Corporation Suwa University of Science Foundation, Nagano (JP); SEIKO EPSON CORPORATION, Tokyo (JP)

( * ) Notice: Subject to any disclaimer, the term of this patent is extended or adjusted under 35 U.S.C. 154(b) by 146 days.

(21) Appl. No.: 18/948,434

(22) Filed: Nov. 14, 2024

(65) Prior Publication Data

US 2025/0164856 A1 May 22, 2025

(30) Foreign Application Priority Data

Nov. 17, 2023 (JP) ................................ 2023-195907

(51) Int. Cl.
*H04N 23/55* (2023.01)
*G03B 11/00* (2021.01)
*G03B 17/12* (2021.01)
*H04N 23/12* (2023.01)

(52) U.S. Cl.
CPC ............. *H04N 23/55* (2023.01); *G03B 11/00* (2013.01); *G03B 17/12* (2013.01); *H04N 23/12* (2023.01)

(58) Field of Classification Search
CPC ........ H04N 23/12; H04N 23/55; G03B 11/00; G03B 17/12
See application file for complete search history.

(56) References Cited

U.S. PATENT DOCUMENTS

2018/0007760 A1* 1/2018 Ollila ..................... G02B 5/208
2023/0017905 A1 1/2023 Saito

FOREIGN PATENT DOCUMENTS

| | | | | |
|---|---|---|---|---|
| CN | 112311980 A * | 2/2021 | H04N 23/60 |
| CN | 112492182 A * | 3/2021 | H04N 23/60 |
| CN | 113970826 A * | 1/2022 | H04N 25/76 |
| JP | 2023013471 | 1/2023 | |
| WO | WO-2024127886 A1 * | 6/2024 | H04N 23/51 |
| WO | WO-2024128088 A1 * | 6/2024 | G02B 5/284 |

* cited by examiner

*Primary Examiner* — Daniel M Pasiewicz
(74) *Attorney, Agent, or Firm* — JCIPRNET

(57) ABSTRACT

A spectral camera includes a spectral filter having an optical region that transmits light having a predetermined wavelength out of incident light; an imaging device having an effective imaging region larger than the optical region; and an imaging optical system configured to guide the light having the predetermined wavelength passing through the optical region in such a way that the light having the predetermined wavelength is brought into focus at the imaging device. The spectral filter is disposed within a predetermined range extending along an optical axis of the imaging optical system and centered around a position where a chief ray of a luminous flux brought into focus at a peripheral section of the effective imaging region intersects with the optical axis.

3 Claims, 7 Drawing Sheets

SPECTRAL CAMERA

The present application is based on, and claims priority from JP Application Serial Number 2023-195907, filed Nov. 17, 2023, the disclosure of which is hereby incorporated by reference herein in its entirety.

BACKGROUND

1. Technical Field

The present disclosure relates to a spectral camera.

2. Related Art

There has been a known spectral camera that produces a spectral image of a desired wavelength (see JP-A-2023-013471). In the spectral camera described in JP-A-2023-013471, a wavelength tunable spectral filter is disposed between a detachable lens unit and an imaging device. The light reflected off or passing through an imaging target enters the lens unit, is dispersed in terms of wavelength by the spectral filter, and light having a predetermined wavelength is then captured by the imaging device in the form of image. The spectral filter used in the spectral camera includes a pair of reflective films facing each other with a gap therebetween that corresponds to the spectrally extracted wavelength, and the region where the pair of reflective films overlap each other when viewed in an optical axis direction is a light optical region that can transmit the light.

JP-A-2023-013471 is an example of the related art.

In a typical spectral filter, since the spectrally extracted wavelength is produced in a stable manner because inclination or deflection of the reflective films are suppressed, the reflective films are designed to be relatively small, and the optical region of the reflective films, which can transmit the light, is a relatively small region as compared with the optical regions of the other optical elements in the spectral camera. Therefore, in the spectral camera described in JP-A-2023-013471, the spectral filter may function as an unintended diaphragm, resulting in vignetting of the spectral image. As a result, there is a problem of a decrease in the effective size of the spectral image.

SUMMARY

A spectral camera according to an aspect of the present disclosure includes: a spectral filter having an optical region that transmits light having a predetermined wavelength out of incident light; an imaging device having an effective imaging region larger than the optical region; and an imaging optical system configured to guide the light having the predetermined wavelength passing through the optical region in such a way that the light having the predetermined wavelength is brought into focus at the imaging device, and the spectral filter is disposed within a predetermined range extending along an optical axis of the imaging optical system and centered around a position where a chief ray of a luminous flux brought into focus at a peripheral section of the effective imaging region intersects with the optical axis.

BRIEF DESCRIPTION OF THE DRAWINGS

FIG. 2 is a cross-sectional view showing a spectral filter in the present embodiment.

FIG. 4 is a diagrammatic view for illustrating an effective imaging region and an image formation region in the present embodiment.

DESCRIPTION OF EMBODIMENTS

An embodiment of the present disclosure will be described below.

Figure 1:
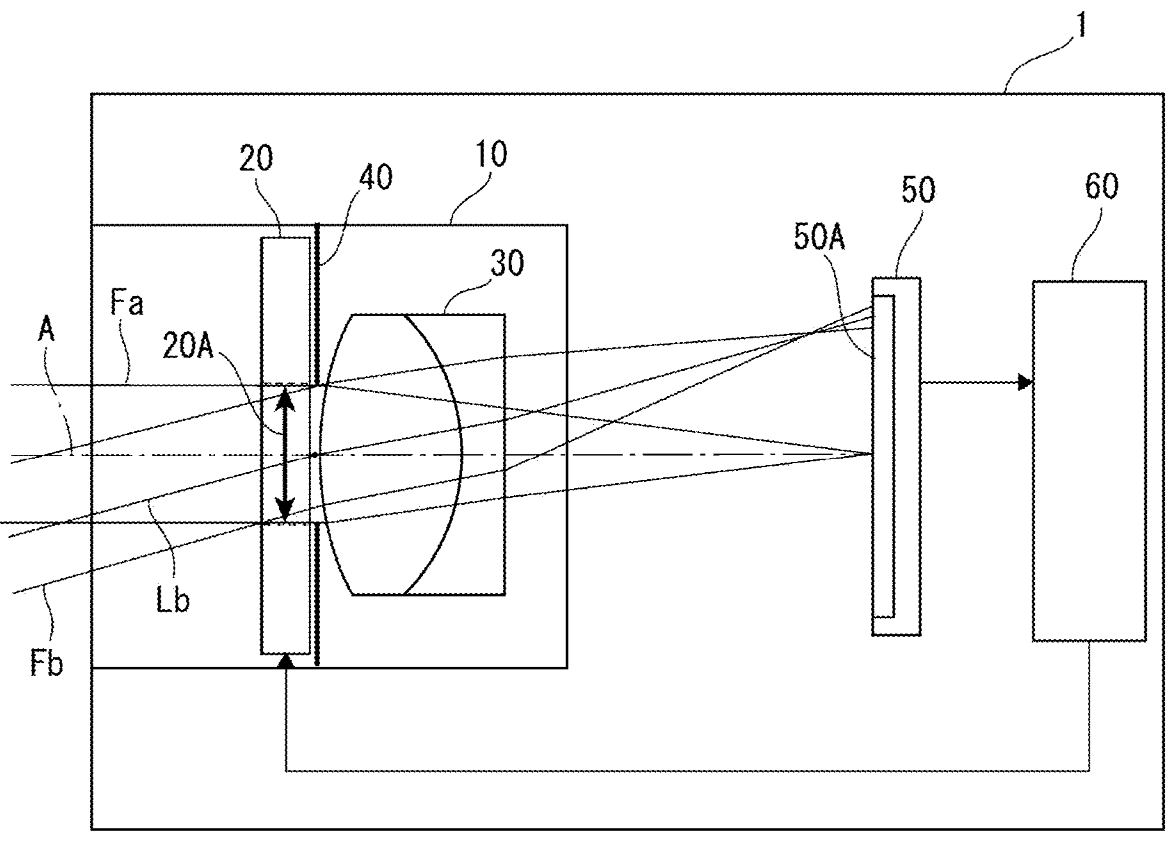
FIG. 1 is a diagrammatic view showing a schematic configuration of a spectral camera according to an embodiment of the present disclosure.

FIG. 1 is a diagrammatic view showing a schematic configuration of a spectral camera 1 according to the present embodiment. In FIG. 1, the spectral camera 1 includes an optical unit 10, which light reflected off or passing through an imaging target enters as incident light, an imaging device 50, which captures the light having passed through the optical unit 10 in the form of image, and a controller 60, which controls the optical unit 10 and the imaging device 50, and the thus configured spectral camera 1 acquires a spectral image of the imaging target. The spectral camera 1 according to the present embodiment can be incorporated, for example, in a portable terminal apparatus such as a smartphone or a small flying object such as a drone.

The optical unit 10 includes a spectral filter 20, which transmits light having a predetermined wavelength out of the incident light, an imaging optical system 30, which guides the light having the predetermined wavelength spectrally extracted by the spectral filter 20, and a diaphragm 40, which defines the size of a luminous flux passing through the imaging optical system 30. The optical unit 10 may be housed in a housing such as a lens holder and handled as an integral unit. In the following description, directions are expressed in some cases by using an optical axis A of the imaging optical system 30.

Figure 2:
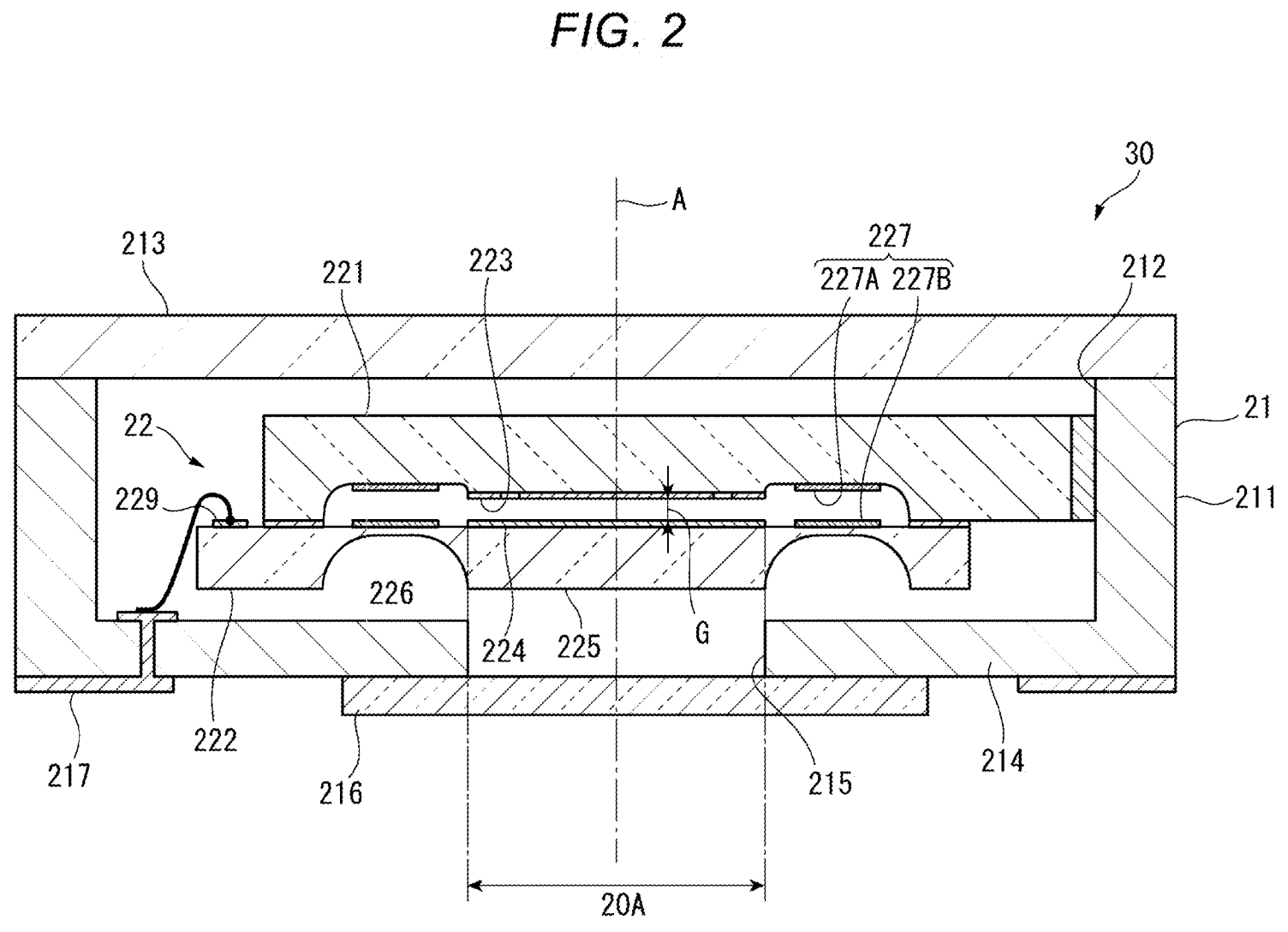

The spectral filter 20 includes an enclosure 21 and an interference filter 22 accommodated in the enclosure 21, as shown in FIG. 2.

The enclosure 21 includes a light-shielding, container-shaped base 211, a first light transmissive plate 213, which closes an opening 212 of the base 211, and a second light transmissive plate 216, which closes an opening 215, which passes through a bottom section 214 of the base 211. A side portion of the interference filter 22 is bonded to the inner circumferential surface of the base 211.

When viewed along the optical axis A, the center of the opening 215 of the base 211 is located at the center of an optical region 20A, which will be described later, and the size of the opening 215 is equal to the size of the optical region 20A.

The interference filter 22 is a wavelength-tunable Fabry-Perot etalon element. Specifically, the interference filter 22 includes a first substrate 221 and a second substrate 222 facing the first substrate 221. A first reflective film 223 is provided at the surface of the first substrate 221 that faces the second substrate 222, and a second reflective film 224 facing the first reflective film 223 is provided at the surface of the second substrate 222 that faces the first substrate 221.

That is, the first reflective film 223 and the second reflective film 224 are disposed to face each other with a gap G therebetween. The first reflective film 223 and the second reflective film 224 may each be configured, for example, with a metal film or a metal alloy film, or may be configured with a dielectric multilayer film.

In the description, the region where the first reflective film 223 and the second reflective film 224 coincide with each other when viewed along optical axis A is referred to as the optical region 20A. The optical region 20A has, for example, a circular shape when viewed along the optical axis A, and the center of the optical region 20A in the present embodiment coincides with the center of the diaphragm 40, which will be described later, that is, the optical axis A of the imaging optical system 30 (see FIG. 4).

The second substrate 222 is provided with a movable section 225, which is provided with the second reflective film 224, and a diaphragm section 226, which is provided to surround the outer circumference of the movable section 225 and is thinner than the movable section 225.

The first substrate 221 includes a first electrode 227A provided at the surface facing the second substrate 222, and the second substrate 222 includes a second electrode 227B provided to face the first electrode 227A. The first electrode 227A and the second electrode 227B constitute an electrostatic actuator 227. When a voltage is applied to the space between the first electrode 227A and the second electrode 227B, the diaphragm section 226 is bent, so that the movable section 225 is displaced toward the first substrate 221. The dimension of the gap G thus changes, and light having a wavelength according to the dimension of the gap G passes through the interference filter 22. That is, the optical region 20A transmits light having a predetermined wavelength out of the incident light.

Terminals 229 corresponding to the first electrode 227A and the second electrode 227B are provided at portions of the second substrate 222. The terminals 229 are electrically coupled to external portions via through terminals 217 provided at the enclosure 21.

The arrangement of the spectral filter 20 in the spectral camera 1 according to the present embodiment will be described later.

The imaging optical system 30 is configured with the combination of multiple lenses, as shown in FIG. 1. The imaging optical system 30 has a lens configuration that guides the light having a predetermined wavelength having passed through the spectral filter 20 in such a way that the light of the predetermined wavelength is brought in focus at the imaging device 50. Note that FIG. 1 shows by way of example a case where the imaging optical system 30 is a doublet lens and a luminous flux from infinity enters the imaging optical system 30.

The diaphragm 40 is an aperture stop of the imaging optical system 30, and has an opening that defines the size of the luminous flux passing through the imaging optical system 30. The diaphragm 40 in the present embodiment is, in particular, a variable diaphragm capable of changing the size of the luminous flux passing through the imaging optical system 30. When viewed along the optical axis A, it is preferable, but not necessarily, that the maximum opening diameter of the diaphragm 40 is equal to the diameter of the optical region 20A of the spectral filter 20, and that the minimum opening diameter of the diaphragm 40 is smaller than the diameter of the optical region 20A of the spectral filter 20. Note that FIG. 1 shows by way of example a case where the diaphragm 40 is set at the maximum opening diameter. When viewed along the optical axis A, the center of the diaphragm 40 coincides with the optical axis A of the imaging optical system 30.

The imaging device 50 is an image sensor such as a charge coupled device (CCD) or a complementary MOS (CMOS) device. The imaging device 50 has an effective imaging region 50A, which is located at the light receiving surface and has multiple pixels. When the effective imaging region 50A receives light, a light reception signal is output from each of the pixels in the effective imaging region 50A, so that a captured image that is image data can be acquired. Since the effective imaging region 50A in the present embodiment receives the light having the predetermined wavelength spectrally extracted by the spectral filter 20, the captured image is a spectral image of the predetermined wavelength.

In FIG. 1, the imaging device 50 is disposed at the image-side focal point of the imaging optical system 30 so that a target object at infinity can be imaged.

Figure 4:
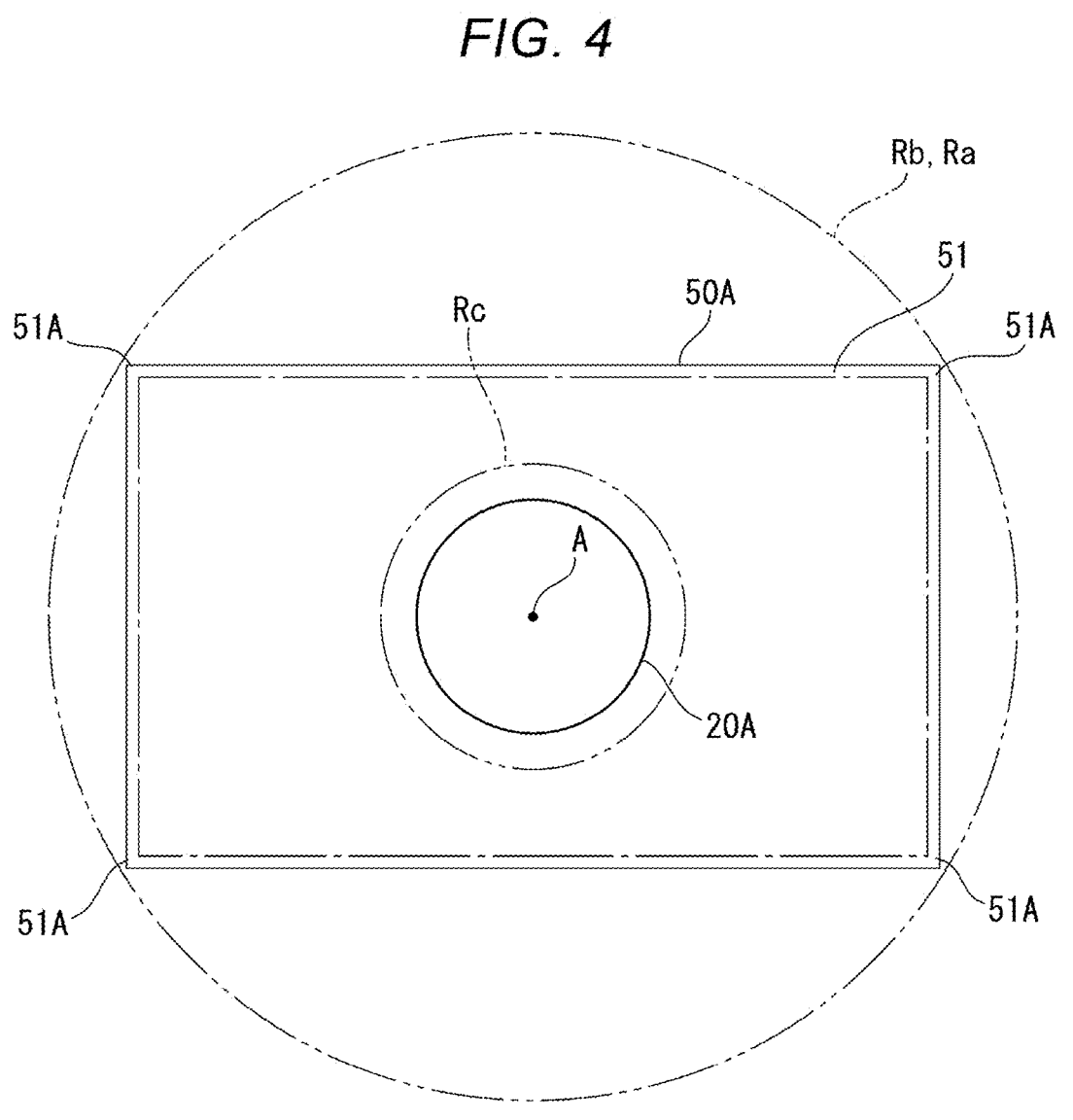

When viewed along the optical axis A, the effective imaging region 50A is larger than the optical region 20A of the spectral filter 20 (see FIG. 4). Specifically, when the effective imaging region 50A has a rectangular shape having a vertical dimension and a horizontal dimension, the minimum dimension (smaller one of vertical and horizontal dimensions) of the effective imaging region 50A is greater than the diameter of the optical region 20A. For example, in the present embodiment, while the diameter of the optical region 20A is suppressed to 2.5 mm or smaller, the minimum dimension of the effective imaging region 50A is 4.0 mm or greater.

The controller 60 includes a drive circuit that controls the operation of driving the optical unit 10, and a light reception control circuit that processes the light reception signal output from the imaging device 50.

The drive circuit applies a drive voltage to the electrostatic actuator 227 of the spectral filter 20 based on an externally input imaging instruction to adjust the gap G of the spectral filter 20 (see FIG. 2). Examples of the imaging instruction may include an instruction to capture spectral images of multiple wavelengths separate from each other by a predetermined wavelength interval, and an instruction to capture a spectral image of a single target wavelength. The drive circuit may output a control signal to an opening driver (not shown) of the diaphragm 40 to control the opening diameter of the diaphragm 40.

The light reception control circuit includes, for example, an amplification circuit that amplifies the light reception signals output from the pixels of the imaging device 50, an A/D conversion circuit that converts the light reception signals into digital signals, and an image generation circuit that generates image data based on the light reception signals corresponding to the pixels and output from the A/D conversion circuit. The light reception control circuit causes the circuits described above to perform signal processing on the light reception signals to calculate grayscale values at the pixels and generates a spectral image in the form of image data.

The controller 60 may include an analysis circuit that performs various types of analysis to be performed on the spectral image.

The arrangement of the spectral filter 20 in the spectral camera 1 will be described with reference to FIGS. 3 to 5. FIG. 4 shows the arrangement of the optical region 20A of the spectral filter 20 and the effective imaging region 50A of the imaging device 50 viewed along the optical axis A.

Figure 3:
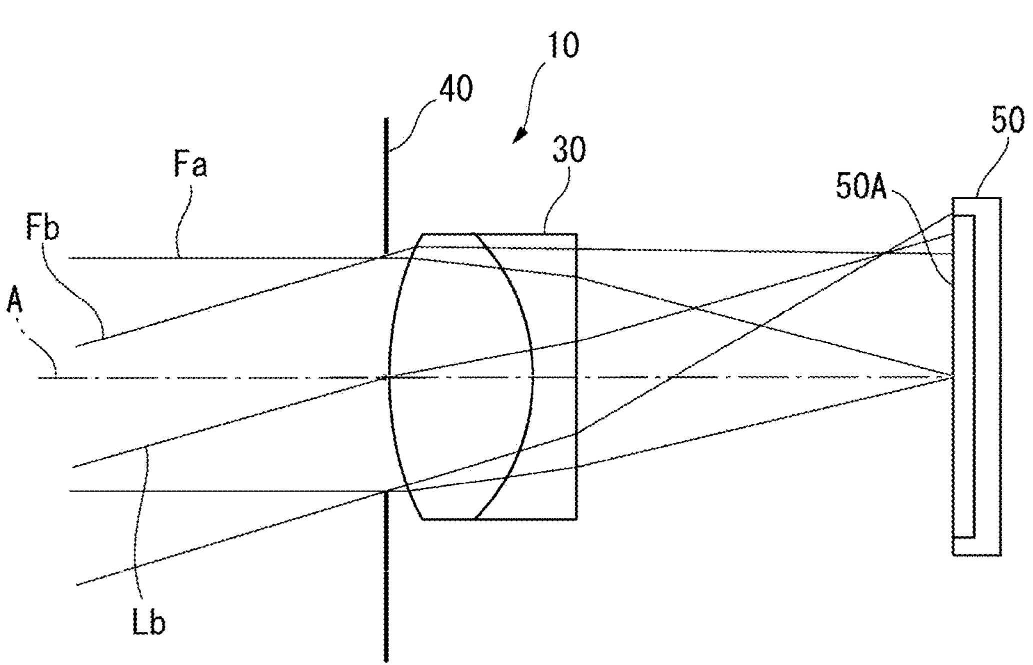
FIG. 3 is a diagrammatic view showing an optical unit before the spectral filter in the present embodiment is disposed.

The positions of the imaging optical system 30 and the diaphragm 40 are first set before the spectral filter 20 is disposed, as shown in FIG. 3. At this point of time, the effective imaging region 50A is located inside an image formation region Rb in the image plane (see FIG. 4).

FIG. 3 shows the following two luminous fluxes by way of example out of the group of luminous fluxes passing through the diaphragm 40: a luminous flux Fa brought into focus at the position that coincides with the optical axis A on the effective imaging region 50A; and a luminous flux Fb brought into focus at a peripheral section 51 (see FIG. 4) of the effective imaging region 50A. The peripheral section 51 of the effective imaging region 50A is a pixel region located in an outermost portion of the effective imaging region 50A (in other words, portion adjacent to boundary of the effective imaging region 50A). In particular, the luminous flux Fb shown by way of example in FIG. 3 is a luminous flux brought into focus at corners 51A (see FIG. 4) of the effective imaging region 50A out of the peripheral section 51 of the effective imaging region 50A and producing an image having a maximum height.

Figure 5:
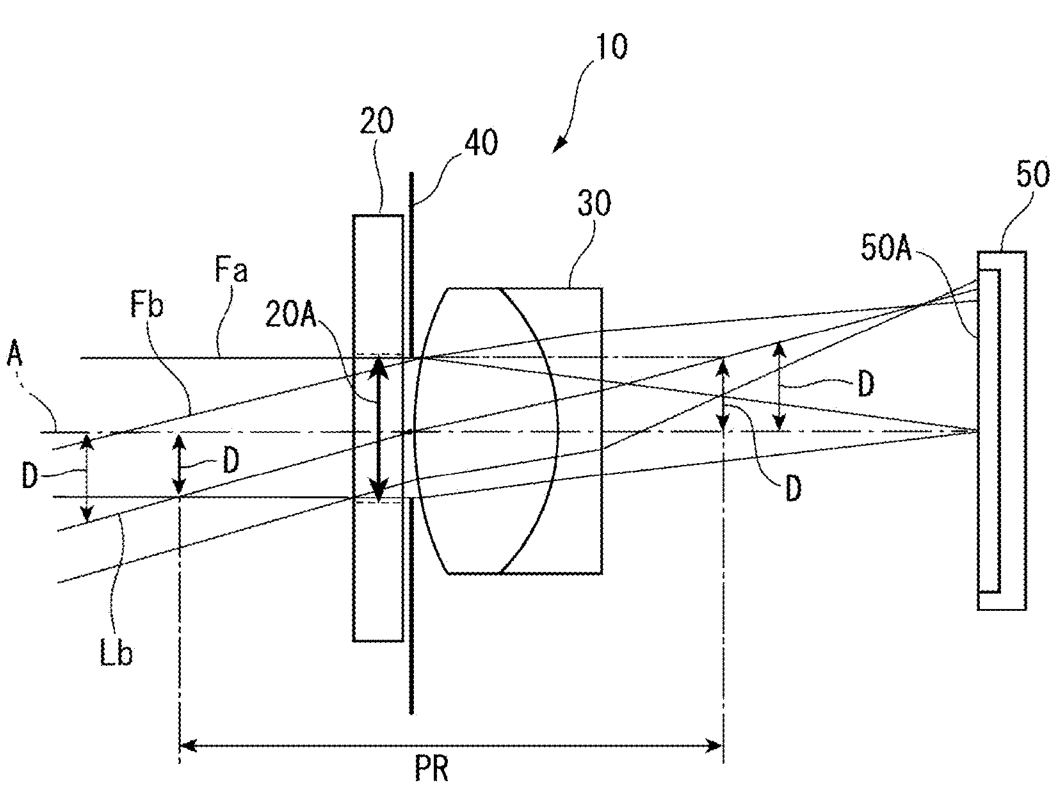
FIG. 5 is a diagrammatic view showing the optical unit after the spectral filter in the present embodiment is disposed.

The spectral filter 20 is then disposed within a predetermined range PR extending along the optical axis A and centered around the position of the diaphragm 40 of the imaging optical system 30, as shown in FIG. 5. In other words, the spectral filter 20 is disposed within the predetermined range PR extending along the optical axis A and centered around the position where the chief ray of the luminous flux Fb to be brought into focus at the peripheral section 51 of the effective imaging region 50A intersects with the optical axis A of the imaging optical system 30. In this process, the center of the optical region 20A of the spectral filter 20 is caused to coincide with the center of the diaphragm 40 (that is, position where chief ray of the luminous flux Fb to be brought into focus at the peripheral section 51 of the effective imaging region 50A intersects with the optical axis A of the imaging optical system 30).

The predetermined range PR used herein is a range within which the spectral filter 20 is arranged and which allows the luminous fluxes Fa and Fb described above to pass through the optical region 20A, and depends on the optical characteristics of the imaging optical system 30. The predetermined range PR in the present embodiment corresponds to a range which extends along the optical axis A and within which a distance D between the optical axis A and a chief ray Lb of the luminous flux Fb, which is brought in focus at the peripheral section 51 of the effective imaging region 50A, is shorter than or equal to the radius of the optical region 20A, as shown in FIG. 5 by way of example.

According to the thus disposed spectral filter 20, the effective imaging region 50A falls within an image formation region Ra after the spectral filter 20 is disposed, as in the imaging region Rb before the spectral filter 20 is disposed, as shown in FIG. 4 by way of example. That is, the effective imaging region 50A is located within the image formation region Ra in the image plane. An image is thus formed across the effective imaging region 50A.

Effects and Advantages of Present Embodiment

As described above, the spectral camera 1 according to the present embodiment includes the spectral filter 20 having the optical region 20A, which transmits light having a predetermined wavelength out of incident light, the imaging device 50 having the effective imaging region 50A larger than the optical region 20A, and the imaging optical system 30, which guides the light having the predetermined wavelength having passed through the optical region 20A in such a way that the light having the predetermined wavelength is brought in focus at the imaging device 50, and the spectral filter 20 is disposed within the predetermined range PR, which extends along the optical axis A and located at the opposite sides of the position where the chief ray of the luminous flux Fb, which is brought in focus at the peripheral section 51 of the effective imaging region 50A intersects with the optical axis A of the imaging optical system 30.

To describe the effects of the spectral camera 1 according to the present embodiment, a spectral camera according to Comparative Example will be described with reference to FIG. 6. Note that the spectral camera according to Comparative Example has the same configuration as that in the present embodiment except for the arrangement of a spectral filter 20B or 20C, and will be described by using the same reference characters in the present embodiment. Although the spectral filters 20B and 20C are shown in FIG. 6 for the sake of description, it is assumed that one of the spectral filters 20B and 20C is disposed.

Figure 6:
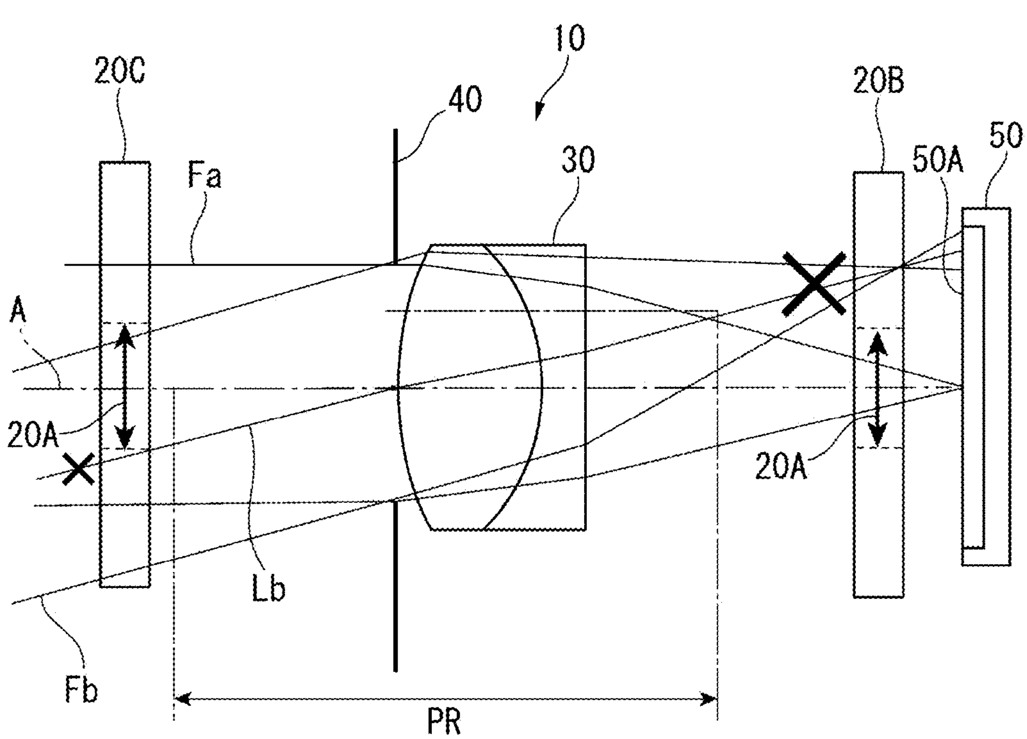
FIG. 6 is a diagrammatic view showing an optical unit in Comparative Example.

If the spectral filter 20B or 20C is disposed at a position separate from the diaphragm 40 (specifically, when the spectral filter 20B or 20C is disposed outside the predetermined range PR along the optical axis A), the luminous flux Fb to be brought into focus at the peripheral section 51 of the effective imaging region 50A may be blocked by the spectral filter 20B and may therefore not be appropriately incident on the optical region 20A, as shown in FIG. 6. In this case, the spectral filter 20B or 20C functions as a field stop that restricts the image formation region Rb. An image formation region Rc in Comparative Example is therefore smaller than the original image formation region Rb (that is, image formation region Rb before the spectral filter 20B is disposed), as shown in FIG. 4, so that vignetting occurs in the spectral image received at the effective imaging region 50A.

There is therefore in Comparative Example a problem of a decrease in the effective image size that enables the spectral measurement, resulting in a problem of decrease in the imaging angle of view and the resolution.

On the other hand, in the present embodiment, the spectral filter 20 is disposed within the predetermined range PR along the optical axis A, as described above. The present embodiment, in which the effective imaging region 50A is located within the image formation region Ra in the image plane, can therefore prevent vignetting of the spectral image received at the effective imaging region 50A. As a result, the effective size of the spectral image is greater than that in Comparative Example, so that the original imaging angle of view and resolution (that is, those before spectral filter 20 is disposed) are available.

Furthermore, as is clear from a comparison between the luminous flux Fa incident on the spectral filter 20 in FIG. 5 and the luminous flux Fa incident on the spectral filter 20B in FIG. 6, the present embodiment allows the luminous flux to be brought into focus at the effective imaging region 50A to pass through a wider range of the optical region 20A. Accordingly, the spectral image is less likely to be affected by foreign matter having adhered to the reflective films, in-plane wavelength unevenness due to deflection of the reflective films, and other factors.

In the present embodiment, when viewed along the optical axis A, the center of the optical region 20A coincides with the position where the chief ray of the luminous flux Fb to be brought into focus at the peripheral section 51 of the effective image pickup region 50A intersects with the optical axis A of the imaging optical system 30.

According to the configuration described above, since the size of the optical region 20A can be effectively used, the spectral filter 20 can be preferably disposed with the size of the optical region 20A suppressed.

In the present embodiment, the predetermined range PR is a range which extends along the optical axis A and within which the distance D between the optical axis A and the chief ray Lb of the luminous flux Fb to be brought in focus at the peripheral section 51 of the effective imaging region 50A is shorter than or equal to the radius of the optical region 20A.

The configuration described above allows preferable arrangement of the typical spectral filter 20 having the circular optical region 20A.

Variations

The present disclosure is not limited to the embodiment described above, and variations, improvements, and other modifications to the extent that the advantage of the present disclosure is achieved fall within the scope of the present disclosure.

In the embodiment described above, the doublet lens is presented by way of example as the imaging optical system 30, but the imaging optical system 30 is not necessarily of a specific type. In addition, the embodiment described above has been presented by way of example with reference to the case where a target object at infinity is imaged, but the present disclosure is not limited thereto, and may be applied to a case where a target object at a finite distance is imaged.

In the embodiment described above, the spectral filter 20 is disposed at the object side of the diaphragm 40, but not necessarily in the present disclosure. For example, if there is no problem with the space, the spectral filter 20 may be disposed at a position between the diaphragm 40 and the spectral filter 20 at the image side of the diaphragm 40.

Figure 7:
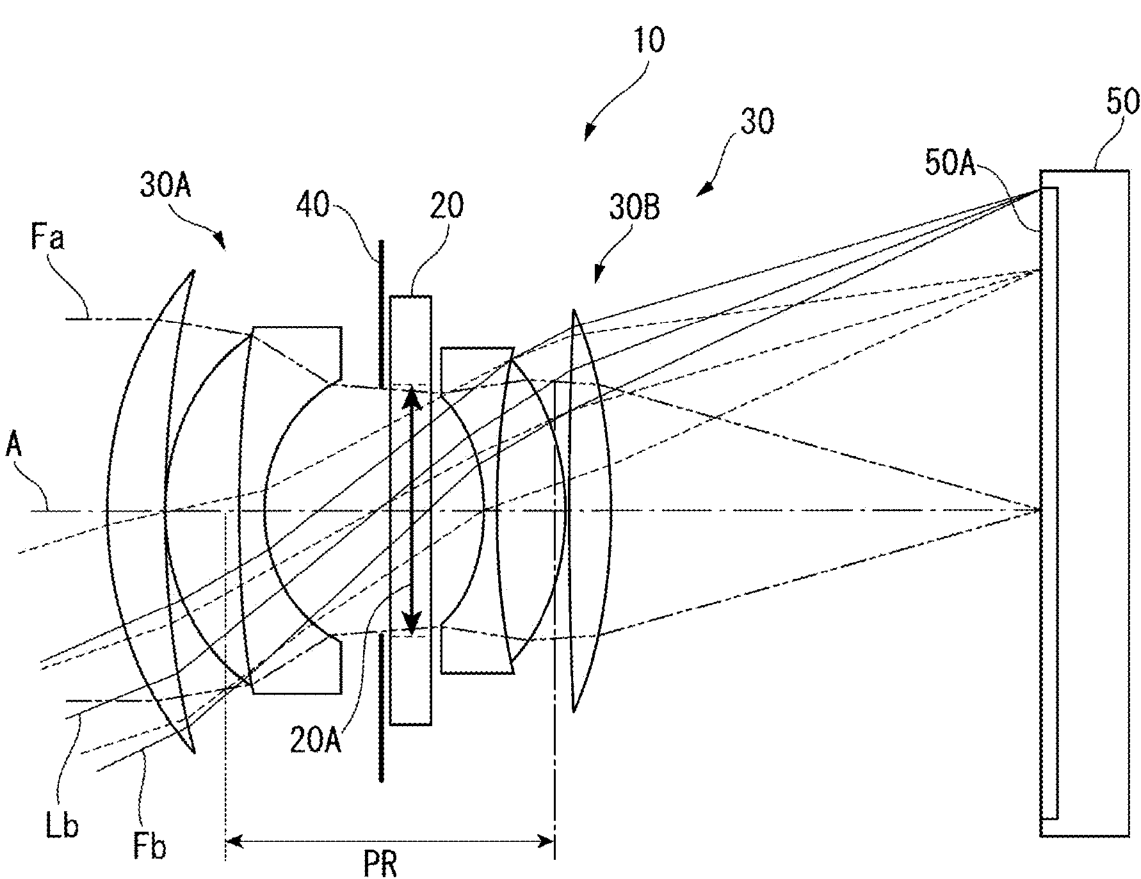
FIG. 7 is a diagrammatic view showing an optical unit in a variation.

In the embodiment described above, the spectral filter 20 is disposed at the object side of the imaging optical system 30, but not necessarily in the present disclosure. For example, the spectral filter 20 may instead be disposed at the image side of the imaging optical system 30. Still instead, the spectral filter 20 may be disposed between a front-group lens 30A and a rear-group lens 30B of the imaging optical system 30 along with the diaphragm 40, as shown in FIG. 7. In the variation shown in FIG. 7, the imaging optical system 30 is, for example, a Gaussian lens. In any of the variations, the imaging optical system 30 brings the light having a predetermined wavelength spectrally extracted by the spectral filter 20 into focus.

In the embodiment described above, the center of the optical region 20A of the spectral filter 20 does not need to coincide with the center of the diaphragm 40, and the optical region 20A does not necessarily have a circular shape.

In addition, in the embodiment described above, the predetermined range PR only needs to be a range within which the spectral filter 20 is arranged and which allows the group of luminous fluxes passing through the optical region 20A to be brought into focus across the region including the peripheral section of the effective imaging region 50A.

The spectral camera 1 according to the embodiment described above may not include the diaphragm 40, and the spectral filter 20 may be disposed to have the function of an aperture stop as "a diaphragm in the imaging optical system 30" in place of the diaphragm 40. Even the variation described above, in which the spectral filter 20 is naturally disposed within the predetermined range PR and centered around the position of the diaphragm in the imaging optical system 30, can prevent vignetting of the spectral image received at the effective imaging region 50A, as in the embodiment described above.

In the embodiment described above, the Fabry-Perot etalon in which the first reflective film 223 and the second reflective film 224 face each other via the gap G is presented by way of example as the spectral filter 20, but other spectral filters may be used. For example, an AOTF (acousto-optic tunable filter), an LCTF (liquid crystal tunable filter), or the like may be used as the spectral filter.

What is claimed is:

1. A spectral camera comprising:

a spectral filter having an optical region that transmits light having a predetermined wavelength out of incident light;

an imaging device having an effective imaging region larger than the optical region; and an imaging optical system configured to guide the light having the predetermined wavelength passing through the optical region in such a way that the light having the predetermined wavelength is brought into focus at the imaging device, wherein the spectral filter is disposed within a predetermined range extending along an optical axis of the imaging optical system and centered around a position where a chief ray of a luminous flux brought into focus at a peripheral section of the effective imaging region intersects with the optical axis.

2. The spectral camera according to claim 1, wherein, when viewed along the optical axis of the imaging optical system, a center of the optical region coincides with the position where the chief ray of the luminous flux brought into focus at the peripheral section of the effective imaging region intersects with the optical axis of the imaging optical system.

3. The spectral camera according to claim 1, wherein the predetermined range is a range which extends along the optical axis and within which a distance between the chief ray of the luminous flux brought into focus at the peripheral section of the effective imaging region and the optical axis is shorter than or equal to a radius of the optical region.

* * * * *